United States Patent [19]
Scharfen

[11] 3,823,627
[45] July 16, 1974

[54] DEVICE FOR CUTTING AND MACHINING DISC-SHAPED WORKPIECES ON BOTH SIDES THEREOF

[75] Inventor: Hans Scharfen, Meerbusch, Germany

[73] Assignee: Paul Forkardt Kommanditgesellschaft, Dusseldorf, Germany

[22] Filed: Jan. 23, 1973

[21] Appl. No.: 326,112

[30] Foreign Application Priority Data
Jan. 28, 1972 Germany............................ 2204034

[52] U.S. Cl........................... 82/2 A, 82/4 A, 82/25, 51/118
[51] Int. Cl............................................. B23b 5/02
[58] Field of Search.......... 82/4 A, 2 R, 12, 25, 1 C, 82/36; 51/118, 106 R

[56] References Cited
UNITED STATES PATENTS
3,473,269  10/1969  Sattler et al. ........................ 51/118
3,572,194  3/1971  Cafolla.............................. 82/36 R
3,593,604  7/1971  Sattler................................ 82/36 R FOREIGN PATENTS OR APPLICATIONS
1,110,984  7/1961  Germany............................... 82/2

*Primary Examiner*—Leonidas Vlachos
*Attorney, Agent, or Firm*—Walter Becker

[57] ABSTRACT

A tool device, especially for machining the sides of a disc shaped workpiece in which indexable cutting tool holders are spaced radially from the axis of rotation of the workpiece with each holder supporting a plurality of cutting elements in uniformly circumferentially spaced relation. The cutting elements nearest the workpiece are in cutting position for cutting the workpiece, while the others of the cutting elements can be brought into cutting position successively by indexing of the holders. The holders may be connected to index in unison and jaw clutch elements are provided for locating the holders in each indexed position. Preferably, the holders are indexable on respective axes which diverge toward the axis of rotation of the workpiece.

11 Claims, 6 Drawing Figures

DEVICE FOR CUTTING AND MACHINING DISC-SHAPED WORKPIECES ON BOTH SIDES THEREOF

The present invention concerns a device for cutting and machining disc-shaped workpieces chucked on a spindle of a turning machine by means of a clamping device, and more specifically, concerns a device as just set forth, in which the cutting and machining is effected by cutting tools which are designed similar to a cutter head with blade inserts detachably connected to a disc-shaped tool carrier and which in case of wear and by means of a control mechanism shifted stepwise by an angle equaling the angular distance between adjacent blade inserts, and are arrested in their working position. The rotation of the tool carrier is effected about an axis which is at an angle with regard to the surface to be machined.

With this heretofore known device, only a unilateral machining of the workpiece takes place. Special steps for a simple and fast exchange of the tool carrier which has only a relatively low number, for instance, four blade inserts are not available. Finally, the above mentioned heretofore known device has the drawback that the arresting of the shaft supporting the tool carrier in its working position is effected merely by an eccentric clamping roller which is pressed against the circumference of the shaft by means of a lever. These steps are not sufficient to absorb large forces which occur at the high cutting speeds of in particular ceramic cutting material.

It is, therefore, an object of the present invention further to develop a device of the above mentioned heretofore known type for machining disc-shaped workpieces so as to be able to replace the tool carrier with worn blade inserts in a simple manner and in a minimum of time and to assure a safe arresting of the tool carriers in their working positions.

These and other objects and advantages of the invention will appear more clearly from the following specification, in connection with the accompanying drawings, in which.

Figure 1:
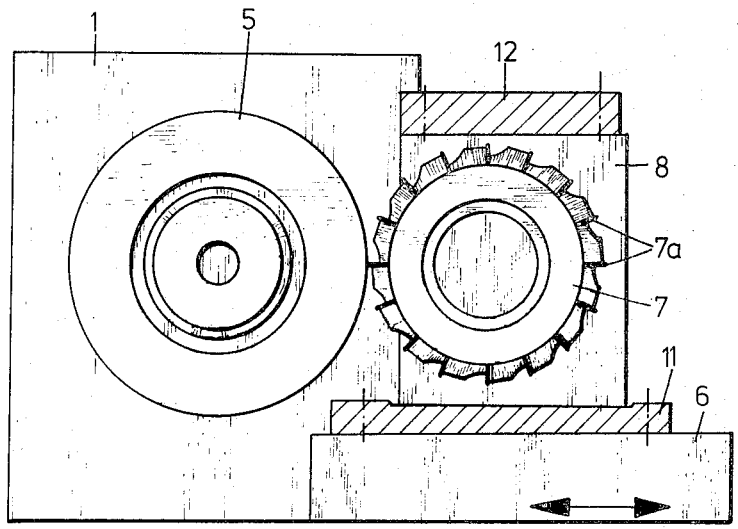
FIG. 1 is a front view of a device according to the invention prior to the start of the machining of a workpiece.

The device according to the present invention is characterized primarily in that for simultaneously cutting and machining the workpieces on both sides thereof, the tool carriage has arranged thereon two carriers which are detachably connected to the respective piston rod of a piston which latter is displaceably and rotatably journaled in a housing fastened to the tool carriage, said tool carriers being adapted in their working position to be arrested by means of spur gears on the housing.

In view of the arrangement of two tool carriers, it is possible to cut and machine disc-shaped workpieces simultaneously on both sides thereof. The detachable connection of the tool carrier on the piston rod makes possible a fast exchange of the tool carriers when the blade inserts have worn. The connection of the tool carrier to the piston rod of a piston displaceably and rotatably journaled in a housing, and the design of a spur gear on the tool carrier as well as on the housing result in a safe arresting or locking of the cutting holes in their working position and also permit a fast release for the control movement to which end it is merely necessary to move the pistons to their previous end position. Thus, with a simple construction there is obtained a device which is easy to operate, operates safely, reduces idling times to a minimum and may be used not only for specific, but also generally for turning machines, inasmuch as it can be mounted on any desired tool carriage.

The design according to the present invention furthermore has the advantage that also during a shift change, the tool carriers provided with worn cutting blade inserts can be quickly withdrawn from the piston and can be replaced by new tool carriers. The tool carriers with worn blade inserts are subsequently equipped with new cutting blade inserts.

According to a further feature of the invention, the two tool carriers are arranged at an acute angle with regard to each other and by means of a coupling, for instance, coupling pins are connected to each other so as to prevent a relative rotation of one tool carrier to the other tool carrier. Moreover, the two tool carriers are adapted to be driven by a common control mechanism which is arranged on that side of the tool carriage which faces away from the spindle. In this way, the device according to the present invention requires relatively little space and represents a compact structural unit which can be arranged even in crowded machining halls of turning machines.

In order to assure a closed power flow for the cutting forces to be absorbed by the device according to the invention and to realize the necessary rigidity against bucking or tilting up of the device, the two housings may be connected to each other by a yoke plate. The thus obtained box-shaped design of the device permits a prepared withdrawal of the chips during the chip-removing machining operation of the dust, directly at the plate where they originate.

Inasmuch as the device according to the invention for purposes of cutting and machining disc-shaped workpieces on both sides is to be employed not only for coarse cutting, but also for fine cutting and machining, the present invention provides means for withdrawing the blade inserts without leaving grooves. To this end, the housings carrying the tool carriers are, according to a further feature of the invention, pivotally journaled on the tool carriage and pivotable about an axis which is perpendicular to the axis of rotation of the tool carriers.

After the tool carrier has advanced to its normal position, with a finish machining, after completion of the advance, the two housings are slightly tilted so that the oppositely located blade inserts will be moved away from each other by fractions of millimeters. During the subsequent return of the blade inserts, no grooves can be formed in the finish machined workpiece. According to a preferred embodiment of the invention, the two housings are pivotable toward each other by a pivot piston. The pivot angle is limited by abutment bolts which are movable in bores of the base plate and are adapted to be pressed against a set screw so that it will be possible not only to precisely repeat and adjust the distance between the two blade inserts, but also only a limited spreading movement will be assured.

Figure 2:
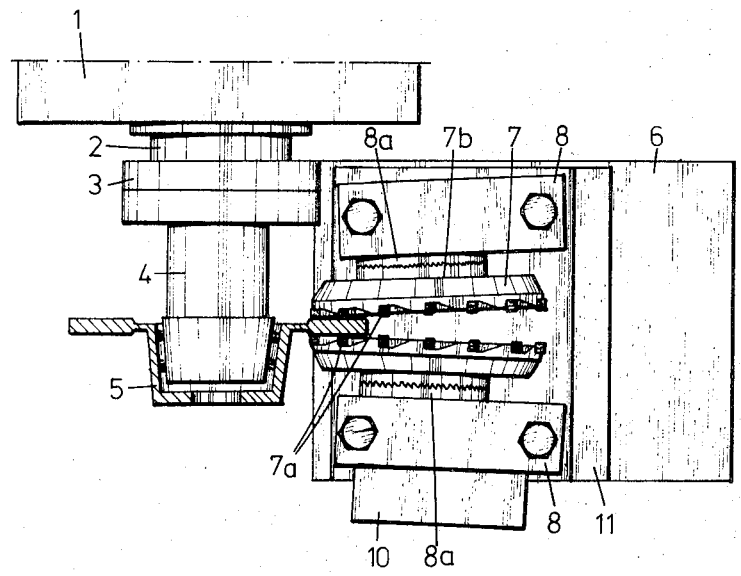
FIG. 2 is a top view of the device according to FIG. 1 after completed advance.

Referring now to the drawings in detail, FIGS. 1 and 2, in addition to showing the device for cutting and machining disc-shaped workpieces on both sides thereof, also show a headstock 1 of a turning machine. The top view of FIG. 2 furthermore illustrates a portion of a spindle 2 with spindle flange 3, which spindle protrudes from the headstock 1. Connected to the spindle flange 3 is a clamping mandrel 4 for receiving a workpiece 5. The specific workpiece 5 illustrated in the drawing represents a brake disc for disc brakes of motor vehicles.

Figure 3:
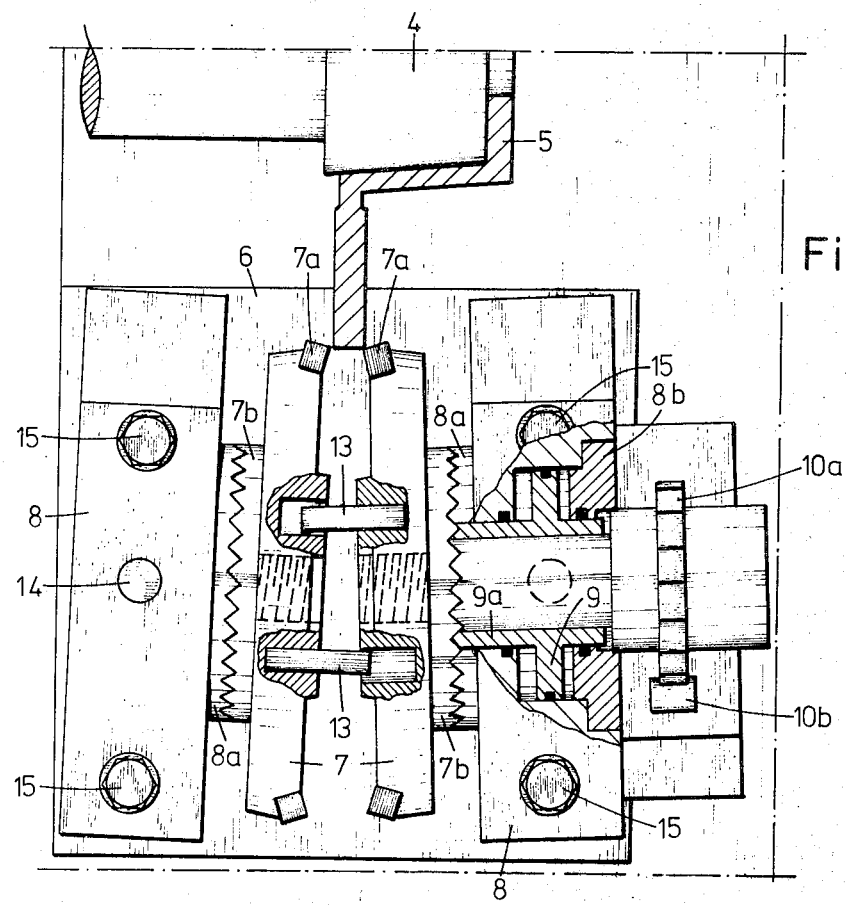
FIG. 3 is a partly sectioned top view of a second pivotable embodiment of the invention.
Figure 4:
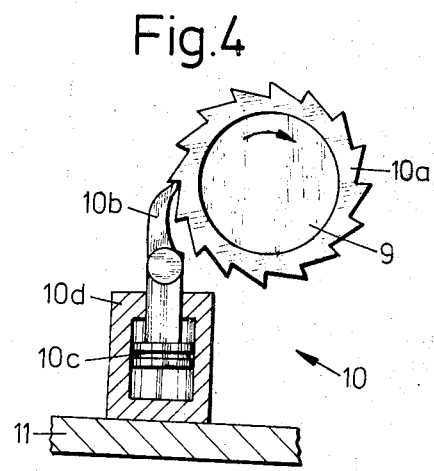
FIG. 4 is a side view of the control mechanism employed in connection with the embodiment of FIG. 3.
Figure 5:
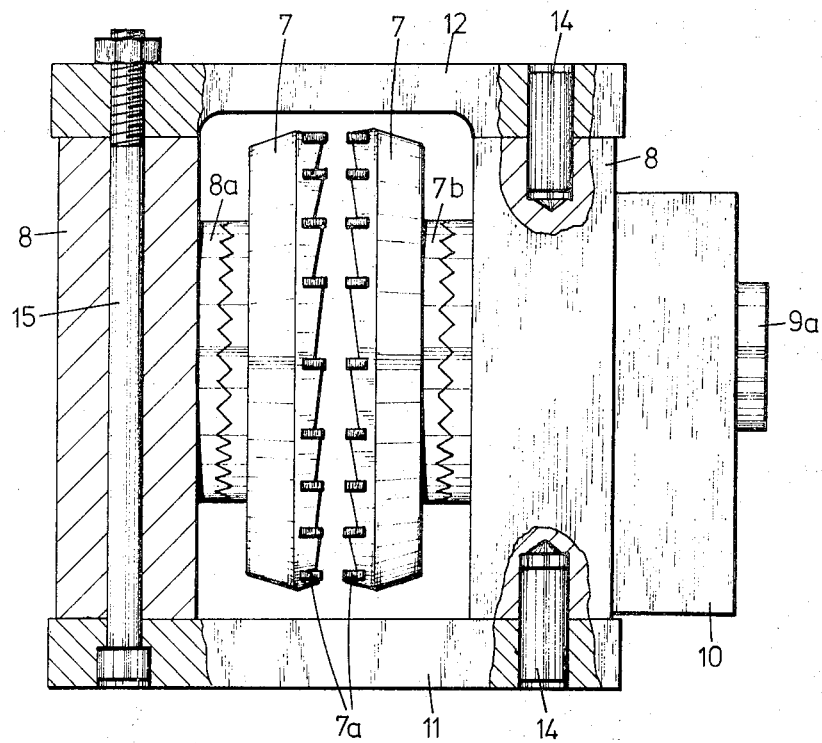
FIG. 5 shows a partly sectioned side view of the device according to FIG. 3.

The tools for cutting and machining both sides of the workpiece 5 are arranged on a tool carriage 6 which is displaceable in the direction of the double arrow A. Mounted on the carriage 6 are two disc-shaped tool carriers 7 which are designed in the manner of a cutter head and which are provided with a plurality of blade inserts 7a. The specific embodiment illustrated in the drawing has sixteen blade inserts 7a of ceramic cutting material exchangeably connected to each tool carrier 7. The tool carriers 7 are respectively detachably connected to a piston rod 9a of a piston 9 which is displaceably mounted in a housing 8. The design of the piston 9 within the housing 8 is clearly illustrated in the partial section of FIG. 3 where it is also known that the cylindrical bore for the piston 9 is closed by means of a housing cover 8b.

In order to obtain a firm location of the tool carrier 7 on housing 8 during the cutting operation, the tool carrier 7 and the housing 8 are respectively provided with spur gear teeth 7b, 8b, which by means of an axial movement of the piston 9 are adapted to be engaged with each other and disengaged from each other. In order to be able successively to make effective the blade inserts 7a arranged on the tool carrier 7, the piston 9 is rotatably journaled in the housing 8. The piston rod 9a can be turned stepwise by a control mechanism 10. The control mechanism 10 is, in FIG. 2, illustrated merely as a structural unit. In FIG. 1 there is shown that the two housings 8 are arranged on a base plate 11 and are connected to each other by means of a yoke plate 12 in order to permit a closed power flow of the cutting forces to be absorbed by the housings 8 and to prevent a bucking or tilting up of the housing 8 in which the two tool carriers 7 are mounted. For the sake of clarity, the yoke plate 12 is shown only in FIG. 1, but has been omitted in FIG. 2.

The first embodiment of the invention, as illustrated in FIGS. 1 and 2, has the two tool carriers 7 arranged with regard to each other at an acute angle in order, in spite of the narrow arrangement of blade inserts 7a, to be able each time to bring only one blade insert 7a into working contact with the workpiece 5, when the tool carriage 6 is moved from its starting position of FIG. 1 to the end position of FIG. 2.

In FIGS. 3 to 6 showing the second embodiment of the present invention, there is shown the design of the control mechanism 10. This control mechanism comprises a ratchet wheel 10a connected to the piston rod 9a and furthermore comprises a pawl 10b which is connected to an actuating piston 10c and is mounted on the base plate 11 in a cylindrical housing 10d. By each stroke of the actuating piston 10c, the ratchet wheel 10a is advanced in the direction of the arrow B by an angle which corresponds to the angle between the blade inserts 7a on the tool carrier 7.

In order in a narrow working space, especially on that side of the workpiece 5 which faces toward the spindle flange 3 to get by with a minimum of space requirement, the two tool carriers 7 are connected to each other by a clutch so as to prevent rotation of one tool carrier to the other. This clutch according to the embodiment shown in the drawing comprises two clutch pins 13 having one end firmly arranged in a tool carrier 7 and having its other end adapted to engage a bore of the other tool carrier 7, said bore being able in view of its greater diameter to permit the necessary freedom of movement in spite of the inclined position of the two tool carriers 7 with regard to each other. A precise arresting of the two tool carriers 7 is effected by the spur gears 7b and 8a which determine the tool carriers 7 by the pistons 9 on the respective housing 8.

Figure 6:
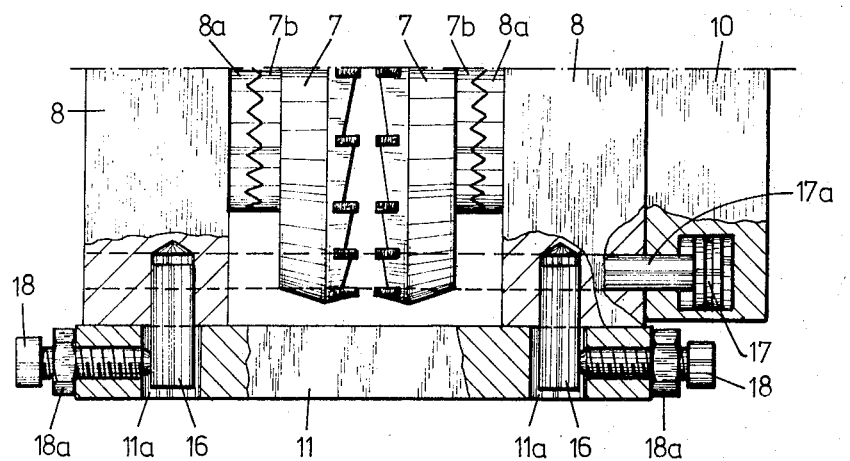
FIG. 6 is a further side view, partially in section of a device according to the invention and illustrates the pivoting drive.

In order to permit a groove-free return of the tool carrier 7, the housings 8 are pivotally mounted on the base plate 11 so as to be pivotable about an axis which extends perpendicularly with the axis of rotation of the tool carrier 7. The pivot shaft is respectively formed by two pivot bolts 14 which are journaled in the base plate 11 and yoke plate 12 and in housing 8. A connection of the yoke plate 12 with the base plate 11 and a chucking of the housing 8 therebetween is effected by clamping screws 15 which, however, permit a slight tilting of the housing 8. The tilting movement is effected by a pivotable piston 17 which in conformity with FIG. 6 is arranged inside the housing of the control mechanism 10. The piston rod 17a of the piston 17 connects the two housings 8 at one side to each other so that an actuation of the pivot bolt 17 will bring about a slight increase or decrease in the angle formed between the tool carriers 7. In order to create a definite working position, the housings 8 are equipped with abutment bolts 16 which are movable within slightly larger bores 11a in the base plate 11. When in working position, the abutment bolts 7 engage adjusting screws 18 which extend into the bores 11a and are adapted to be held in their desired position by means of a counter nut 18a.

For purposes of cutting and machining the workpiece 5 on both sides thereof, that surface of the piston 17 is acted upon which is adjacent the cover, so that the abutment bolts 16 are firmly pressed against the setting screws 18. With this position of the tool carriers 7, the tool carriage 6 is fed against the workpiece 5 in conformity with FIG. 3. After completion of the advance stroke, that surface of the piston 7 which is adjacent the piston rod is acted upon whereupon the two blade inserts 7a which are being employed are slightly removed from each other so that the tool carrier 6 can, without the formation of grooves on the finish machined workpiece 5, be returned to its starting position.

As soon as the permissible lifetime of the blade inserts 7a has come to an end, which may occur, for instance, after machining some 60 to 70 workpieces 5 and which is checked by a counting mechanism, the pistons 9 are actuated in order to move the spur gears 7b of both tool carriers 7 out of engagement with the spur gear 8a of the housing 8. Thereupon, the control mechanism 10 is actuated once so that the next pair of cutting blade inserts 7a becomes effective. This may be brought about as soon as the tool carriers 7 are, by means of the piston 9, again arrested on the respective housing 8. In view of the magazine-like arrangement of a plurality of cutting blade inserts 7a on a disc-shaped tool carrier 7, it is not only possible to replace the worn blade inserts 7a within the normal standstill periods of the machining rhythm of the turning machine by new blade inserts 7a, but in addition thereto also a tool is created which without change can remain in the turning machine over the course of a normal eight-hour shift. During the change of shift, a simple exchange of the tool carriers 7 carrying worn blade inserts 7a can be effected. To this end, the worn blade inserts 7a are disconnected from the piston rod 9a and are replaced by tool carriers 7 equipped with fresh cutting blade inserts 7a. The closed design of the housings 8 arranged on the base plate 11 and interconnected by the yoke plate 12 results not only in the rigidity of the device as it is necessary for high machining precision, but in addition thereto also creates a definite opening for withdrawing the chips and for sucking off the dust occurring during the machining operation.

It is, of course, to be understood that the present invention is, by no means, limited to the particular showing in the drawings, but also comprises any modifications within the scope of the appended claims.

What is claimed is:

1. A tool device for turning simultaneously both parallel outer sides having surfaces of a disc-like workpiece rotatable on a spindle work axis, said device comprising in combination a frame spaced radially from the work axis, shaft means rotatable in the frame and generally coplanar with the axis of rotation of the workpiece, at least one disc on said shaft means having one face in about the plane of one side of the workpiece, cutting elements carried by said disc in uniformly circumferentially spaced relation and protruding from at least said one face of the disc for cutting engagement with said one side of the workpiece when disposed on the side of the disc nearest the workpiece, said disc being a disc-shaped tool carrier, a tool carriage, said cutting elements including cutting tools arranged on said tool carriage, said cutting tools being a cutter head with blade inserts exchangeably connected to said disc-shaped carrier, means for indexing said shaft means for progressively presenting said cutting elements to cutting position, said blade inserts when worn being adapted to be shifted stepwise by an angle equaling the angle between successive individual blade inserts and being adapted to be arrested in working position thereof, the rotation of said tool carrier being effected about an axis which is inclined to the surface to be machined, and for purposes of simultaneously cutting and machining both sides of the workpieces there being two tool carriers arranged on said tool carriage, a housing including a piston and a piston rod, said tool carriers being detachably connected directly to the respective piston rod of said piston which is displaceably and rotatably journaled in said housing connected to said tool carriage, and spur gear means on said housing with said two tool carriers being adapted in their working position to be arrested by said spur gear means on said housing in an acute angle relationship fixedly connected with each other.

2. A tool device for turning at least one side of a disc-like workpiece rotatable on a work axis, said device comprising a frame spaced radially from the work axis, shaft means rotatable in the frame and generally coplanar with the axis of rotation of the workpiece, at least one disc on said shaft means having one face in about the plane of one side of the workpiece, cutting elements carried by said disc in uniformly circumferentially spaced relation and protruding from at least said one face of the disc for cutting engagement with said one side of the workpiece when disposed on the side of the disc nearest the workpiece, means for indexing said shaft means for progressively presenting said cutting elements to cutting position, said shaft means comprising two shafts, a disc on each shaft, each disc having one face in about the plane of a respective side of said workpiece, cutting elements on each disc in uniformly circumferentially distributed relation thereon and protruding from at least the said one face thereof and each adapted for cutting engagement with the respective side of the workpiece when disposed on the side of the respective disc nearest the workpiece, a first element of a jaw clutch nonrotatively connected to each disc on the other face thereof, a second element of a jaw clutch fixed to the frame in opposed coaxial relation to each first element, means for moving said shafts axially to engage and disengage said clutch elements, means for indexing said discs an angle equal to the angular spacing of said cutting elements when said clutch elements are disengaged, said frame comprising a base plate, bearing housings for said shafts mounted on said base plate and upstanding therefrom, and a yoke plate extending between and connected to the ends of said housings remote from said base plate.

3. A tool device according to claim 2 in which the workpiece and frame are moveable relatively in the radial direction of the workpiece.

4. A tool device according to claim 2 in which the axis of said shaft means is inclined relative to the axis of rotation of the workpiece.

5. A tool device according to claim 2 which includes interengageable elements of a jaw clutch operatively and nonrotatably connected to said frame and to said disc respectively, means for disengaging said elements to index said disc, and means for engaging said elements to fix said disc in indexed position thereof.

6. A tool device in combination according to claim 1 in which said shaft means comprises two shafts, a disc on each shaft, each disc having one face in about the plane of a respective side of said workpiece, cutting elements on each disc in uniformly circumferentially distributed relation thereon and protruding from at least the said one face thereof and each adapted for cutting engagement with the respective side of the workpiece when disposed on the side of the respective disc nearest the workpiece, a first element of a jaw clutch nonrotatively connected to each disc on the other face thereof, a second element of a jaw clutch fixed to the frame in opposed coaxial relation to each first element, means for moving said shafts axially to engage and disengage said clutch elements, and means for indexing said discs an angle equal to the angular spacing of said cutting elements when said clutch elements are disengaged.

7. A tool device according to claim 2 in which said shafts are inclined in said frame so as to diverge toward the axis of rotation of the workpiece.

8. A tool device according to claim 7 which includes means interconnecting said discs for indexing movement in unison.

9. A tool device according to claim 2 in which said housings are pivotally connected to said base plate and yoke plate for tilting movement about axes perpendicular to the axes of rotation of the respective shafts.

10. A tool device according to claim 9 which includes fluid operable means connected to said housings for effecting relative tilting movement thereof, and cooperating elements of abutment means on said housings and base plate for limiting the movement of said housings in at least one direction.

11. A tool device according to claim 10 in which at least one element of each said abutment means is adjustable.

* * * * *